United States Patent [19]

Ichinoi

[11] Patent Number: 4,618,894
[45] Date of Patent: Oct. 21, 1986

[54] COLOR VIDEO SIGNAL RECORDING AND REPRODUCING APPARATUS

[75] Inventor: Yutaka Ichinoi, Yokohama, Japan
[73] Assignee: Victor Company of Japan, Ltd., Japan
[21] Appl. No.: 597,708
[22] Filed: Apr. 6, 1984
[30] Foreign Application Priority Data Apr. 7, 1983 [JP] Japan .................................. 58-61293

[51] Int. Cl.⁴ ........................ H04N 5/76; H04N 9/493
[52] U.S. Cl. .................................. 358/310; 360/33.1; 358/328; 358/329
[58] Field of Search ...................... 358/310, 12, 14, 15, 358/328, 329; 360/18, 20, 24, 29, 30, 33.1

[56] References Cited

U.S. PATENT DOCUMENTS 4,163,247 7/1979 Bock et al. ............................ 358/12

Primary Examiner—Robert L. Richardson
Attorney, Agent, or Firm—Andrus, Sceales, Starke & Sawall

[57] ABSTRACT

A color video signal recording and reproducing apparatus comprises a first circuit for producing a luminance signal which has or has not been subjected to a time base compression, a second circuit for forming a time base compressed line-sequential color difference signal, a circuit for generating a time-division-multiplexed signal by time-division-multiplexing output signals of the first and second circuits, a circuit for obtaining a frequency modulated signal by frequency-modulating a carrier by a low-frequency component of the time-division-multiplexed signal, a first converter for producing a low-band converted high-frequency time-division-multiplexed signal, a circuit for recording on a recording medium a signal in which at least the output signal of the first converter and the frequency modulated signal are frequency-division-multiplexed and for reproducing the same, a demodulator for obtaining a reproduced low-frequency time-division-multiplexed signal from the reproduced signal, a second converter for obtaining a reproduced high-frequency time-division-multiplexed signal from the reproduced signal, and a circuit for forming a reproduced color video signal which is in conformance with a standard system, from output signals of the demodulator and the second converter.

7 Claims, 11 Drawing Figures

COLOR VIDEO SIGNAL RECORDING AND REPRODUCING APPARATUS

BACKGROUND OF THE INVENTION

The present invention generally relates to color video signal recording and reproducing apparatuses, and more particularly to a color video signal recording and reproducing apparatus in which a line-sequential color difference signal is obtained by alternately and time-sequentially multiplexing two kinds of color difference signals (including primary color signals) which are obtained from a demodulated signal of a carrier chrominance signal, between a luminance signal and the carrier chrominance signal which make up a color video signal, for every one horizontal scanning period, the line-sequential color difference signal is subjected to a time base compression and is then time-division-multiplexed to the luminance signal so as to obtain a time-division-multiplexed signal, the time-division-multiplexed signal is band-divided into a high-frequency component and a low-frequency component, a frequency modulated signal obtained by frequency-modulating the low-frequency component and a signal obtained by frequency-converting the high-frequency component to a low-frequency band are respectively recorded on a recording medium, and a reproduced color video signal in conformance with a standard system is obtained by subjecting a signal which is reproduced from the recording medium to a signal processing which is in reverse to the signal processing performed at the time of the recording.

Among the existing color video signal recording and reproducing apparatuses such as a video tape recorder (VTR), the popular recording and reproducing apparatus employ the following recording and reproducing method. That is, a luminance signal and a carrier chrominance signal are separated from a composite color video signal of a standard system such as the NTSC, PAL, and SECAM systems. The separated luminance signal is frequency-modulated, and the separated carrier chrominance signal is frequency-converted into a low-frequency band. The frequency converted carrier chrominance signal is frequency-division-multiplexed with the frequency modulated luminance signal, and this frequency-division-multiplexed signal is recorded on a recording medium. At the time of a reproduction, a signal which is reproduced from the recording medium is subjected to a signal processing which is complementary to the signal processing carried out at the time of the recording, so as to obtain a reproduced composite color video signal which is in conformance with the original standard system. In other words, the popular recording and/or reproducing apparatuses employ the so-called low-band conversion recording and reproducing system.

The recording and reproducing apparatus employing the low-band conversion recording and reproducing system, has the following advantages. (I) Because the frequency band of the luminance signal can be selected arbitrarily, the apparatus is especially advantageous when applied to a home use VTR in which the frequency band in which the recording and reproduction can be carried out is relatively narrow. (II) A demodulated chrominance signal is uneasily affected by a time base deviation upon reproduction in the VTR. (III) There is little beat interference because only the luminance signal passes through frequency modulating and frequency demodulating systems, and a pilot signal is not recorded and reproduced. (IV) The frequency modulated luminance signal has a high-frequency biasing effect, and enables recording of the carrier chrominance signal with a satisfactory linearity.

On the other hand, there is a trend to lengthen the recording and reproducing times of the recording and reproducing apparatus, and there is thus a trend to lower the traveling speed of a magnetic tape which is used as the recording medium. Further, there is a demand to enable reproduction of an audio signal with a higher quality. However, since the audio signal is recorded on and reproduced from the magnetic tape by a stationary head, the relative linear velocity between the magnetic tape and the stationary head is small. For this reason, when the traveling speed of the magnetic tape is reduced, the frequency characteristic of the audio signal becomes greatly deteriorated compared to the frequency characteristic of the video signal which is recorded on and reproduced from the magnetic tape by a plurality of rotary video heads. Therefore, it was impossible to record and reproduce the audio signal with a high quality.

Thus, another recording and reproducing system was proposed. According to this proposed recording and reproducing system, the audio signal is converted into a predetermined signal format, and the audio signal having this converted signal format is superimposed on the video signal. The superimposed signal is recorded on and reproduced from the magnetic tape by the rotary video heads. In this proposed recording and reproducing system, the audio signal is recorded on and reproduced from the magnetic tape by the rotary video heads which have a high relative linear velocity with respect to the magnetic tape. For this reason, even in a case where the traveling speed of the magnetic tape is slow, the audio signal can be recorded and reproduced with a quality which is far superior to the quality with which the audio signal can be recorded and reproduced by the stationary head in a state where the traveling speed of the magnetic tape is not reduced.

However, in the recording and reproducing apparatus employing the low-band conversion system described before, two signals, that is, the luminance signal and the carrier chrominance signal must be transmitted in the narrow frequency band. Hence, the frequency band in which the frequency-division-multiplexed signal made up of the frequency modulated luminance signal and the frequency converted carrier chrominance signal is recorded and reproduced, had to be set to a narrow frequency band. Accordingly, the frequency band in which the luminance signal was recorded and reproduced was narrow, and thus, it was impossible to improve the resolution. Moreover, in the proposed recording and reproducing system in which the audio signal is recorded on and reproduced from the same track as the video signal by the rotary video heads with the low-band recording and reproducing system described before, the recording and reproduction were carried out by arranging a frequency modulated audio signal which is obtained by frequency-modulating a carrier by the audio signal into an unoccupied frequency band between the frequency converted carrier chrominance signal and the frequency modulated luminance signal. Therefore, in this proposed recording and reproducing system, the frequency band of the frequency modulated luminance signal became further limited due to the frequency modulated audio signal, and there was a disadvantage in that the resolution became poorer.

SUMMARY OF THE INVENTION

Accordingly, it is a general object of the present invention to provide a novel and useful color video signal recording and reproducing apparatus in which the disadvantages described heretofore have been eliminated.

Another and more specific object of the present invention is to provide a color video signal recording and reproducing apparatus in which a time-division-multiplexed signal in which a time base compressed line-sequential color difference signal and a luminance signal are time-division-multiplexed, is band-divided into a high-frequency component and a low-frequency component, a frequency modulated signal is obtained by frequency-modulating a carrier by the low-frequency component, a low-band converted high-frequency time-division-multiplexed signal is obtained by frequency-converting the high-frequency component to a frequency band which is lower than the frequency band of the frequency modulated signal, a frequency-division-multiplexed signal is obtained by frequency-division-multiplexing the frequency modulated signal and the low-band converted high-frequency time-division-multiplexed signal, the frequency-division-multiplexed signal is recorded on a recording medium, and a reproduced color video signal is obtained by subjecting a signal which is reproduced from the recording medium to a signal processing which is in reverse to the signal processing performed at the time of the recording.

According to the apparatus of the present invention, it is possible to widen the frequency band in which the luminance signal and the color difference signals can be recorded and reproduced, compared to the existing recording and reproducing apparatus which employs the low-band conversion recording and reproducing system. Further, it is also possible to widen the frequency band in which the luminance signal and the color difference signals can be recorded and reproduced, compared to the recording and reproducing apparatus which records an FM audio signal and a video signal on the same track. As a result, the resolution of not only the luminance signal but also the resolution of the color difference signals can be improved over the above two recording and reproducing apparatuses, and it is possible to obtain a reproduced picture of a high quality.

Still another object of the present invention is to provide a color video signal recording and reproducing apparatus in which a comb filter is supplied with an output signal of frequency converting means which frequency-converts the low-band converted high-frequency time-division-multiplexed signal within the signal which is reproduced from the recording medium back to the original frequency band, which comb filter eliminates a crosstalk component from an adjacent track from within the output signal of the frequency converting means. An analog memory or a digital memory is used for a delay circuit within the comb filter. A delay quantity of the delay circuit is variably controlled by a clock pulse which includes a time base deviation introduced at the time of the reproduction. According to the apparatus of the present invention, it is possible to effectively eliminate the crosstalk component from the adjacent track, without being affected by the time base deviation introduced at the time of the reproduction.

Further, the present invention is not limited to these embodiments, but various variations and modifications may be made without departing from the scope of the present invention.

DETAILED DESCRIPTION

Figure 1:
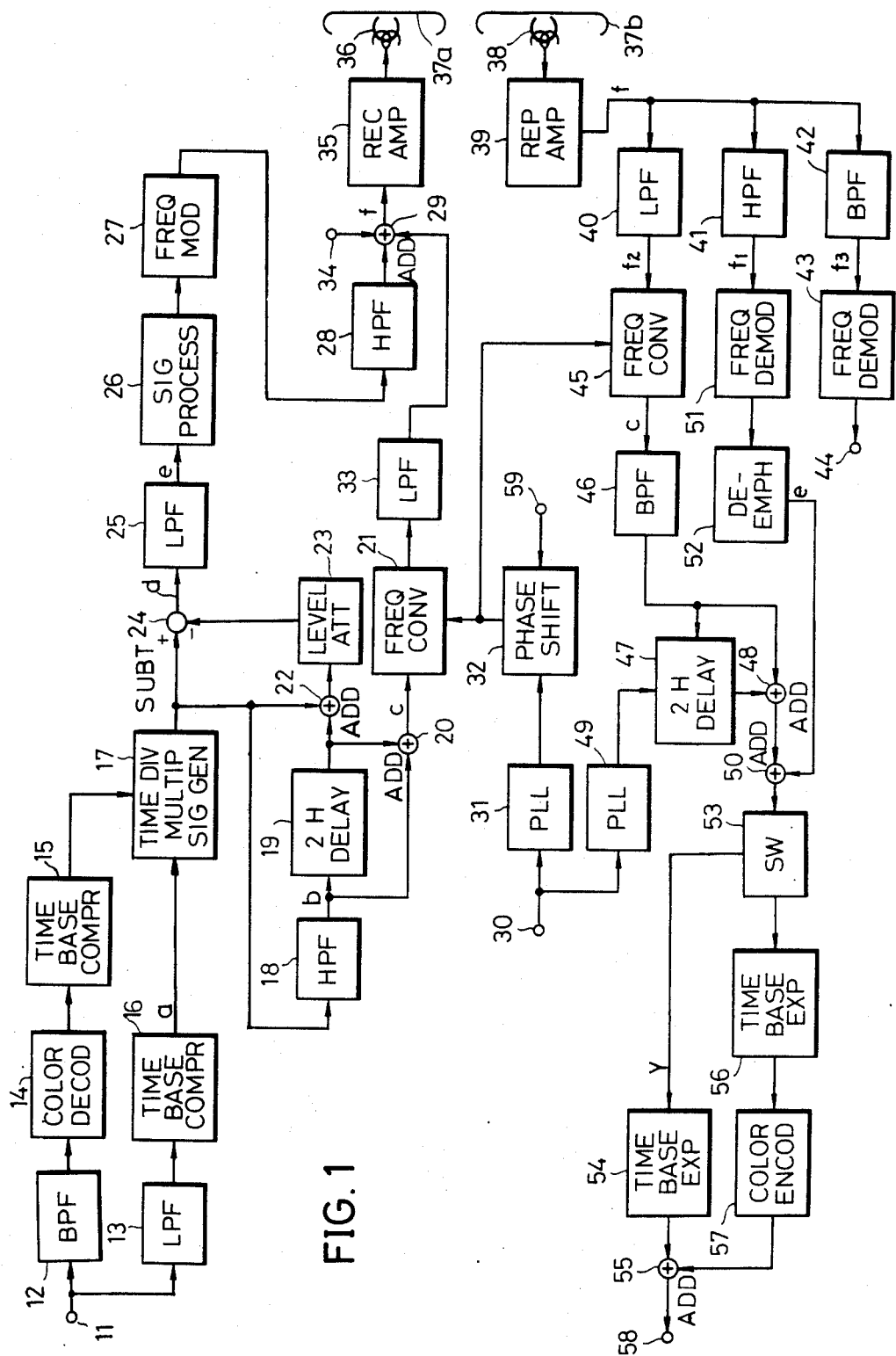
FIG. 1 is a systematic block diagram showing an embodiment of a color video signal recording and reproducing apparatus according to the present invention.

In FIG. 1, a standard system color video signal is supplied to a bandpass filter 12 through an input terminal 11. A carrier chrominance signal is separated in the bandpass filter 12. The color video signal from the input terminal 11 is also supplied to a lowpass filter 13 wherein a luminance signal is separated. The carrier chrominance signal from the bandpass filter 12, is supplied to a color decoder 14 wherein the carrier chrominance signal is demodulated into two kinds of color difference signals (for example, the color difference signals (R−Y) and (B−Y)) and then converted into a line-sequential color difference signal in which the two kinds of color difference signals are multiplexed in time-sequence for every one horizontal scanning period (1H). The line-sequential color difference signal from the color decoder 14, is supplied to a time base compressing circuit 15 wherein the line-sequential color difference signal is time base compressed to approximately 1/5 so as to be transmitted within approximately 20% of a video duration which excludes a horizontal blanking period in a duration of 1H.

Figure 2:
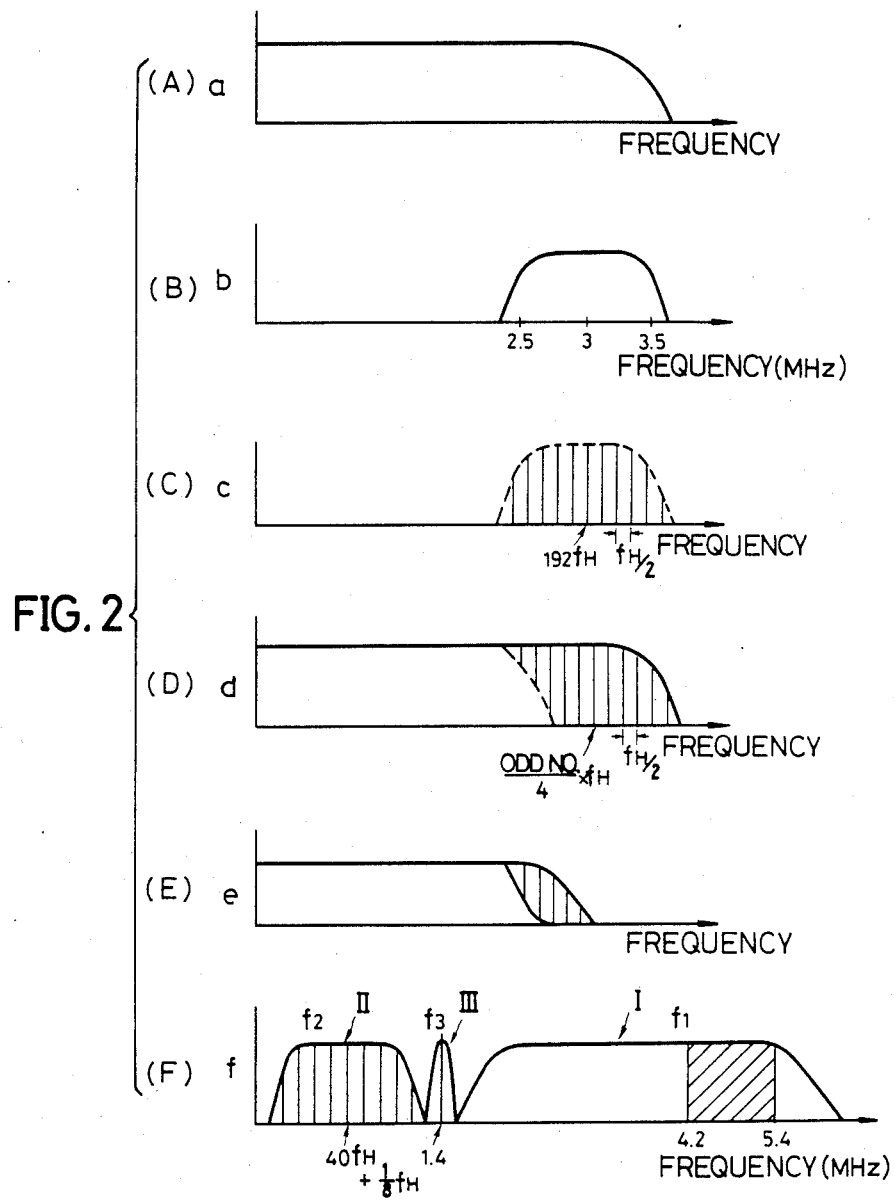
FIGS. 2(A) through 2(F) show frequency spectrums of signals at each part of the block system shown in FIG.1.

On the other hand, the luminance signal which is separated in the lowpass filter 13 with a frequency band which is wider compared to the conventional apparatus, is supplied to a time base compressing circuit 16 wherein the luminance signal is time base compressed to approximately 4/5 so as to be transmitted within approximately 80% of the video duration. Accordingly, a time base compressed luminance signal a having a frequency spectrum shown in FIG. 2(A), is obtained from the time base compressing circuit 16. The frequency band of this time base compressed luminance signal a is approximately 5/4 times the frequency band of the input luminance signal, for example. The construction of the time base compressing circuits 15 and 16 are known from the U.S. Pat. No. 4,245,235, for example.

The time base compressed luminance signal a from the time base compressing circuit 16 and the time base compressed line-sequential color difference signal from the time base compressing circuit 15, are respectively supplied to a time-division-multiplexed signal generating circuit 17. The time-division-multiplexed signal generating circuit 17 generates a multiplexed signal in which a discriminating burst signal is multiplexed to the horizontal synchronizing signal with a period of 2H. The time-division-multiplexed signal generating circuit 17 is designed to sequentially and selectively produce the above multiplexed signal, the time base compressed line-sequential color difference signal, and the time base compressed luminance signal, within a duration of 1H. Accordingly, the time-division-multiplexed signal generating circuit 17 generates a time-division-multiplexed signal in which, the two kinds of time base compressed color difference signals are alternately transmitted for every 1H, one of the time base compressed color difference signals is time-division-multiplexed with the time base compressed luminance signal together with a horizontal synchronizing signal which is generated independently, and the discriminating burst signal for discriminating the transmission lines of the two kinds of color difference signals which constitute the line-sequential color difference signal in a reproducing system is multiplexed to the horizontal synchronizing signal in the transmission line of one of the two color difference signals.

Figure 3:
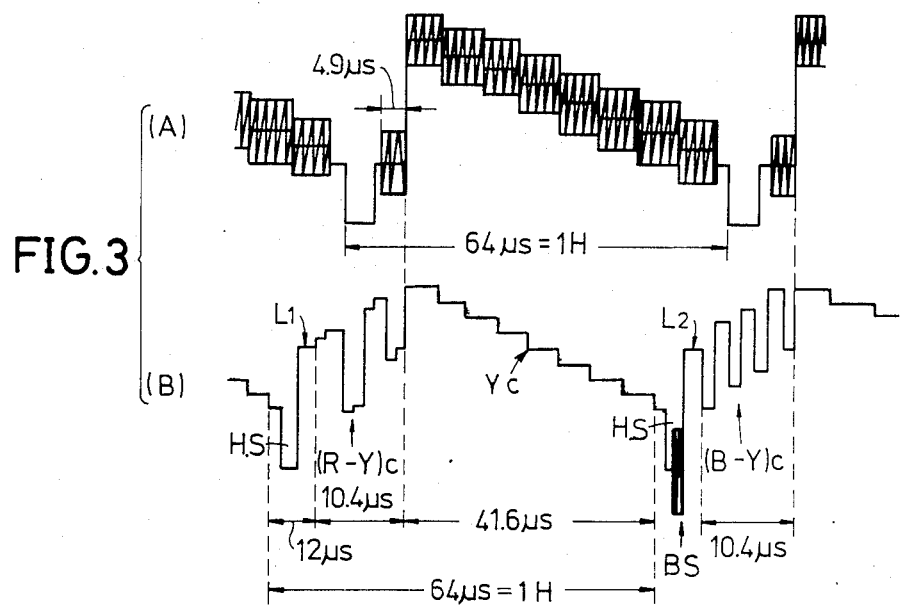
FIGS. 3(A) and 3(B) respectively show an example of a waveform of an input standard system color video signal and an example of a waveform of a time-division-multiplexed video signal.

A case will now be considered where the standard system color video signal applied to the input terminal 11, is a color bar signal having a field frequency of 50 Hz, a horizontal scanning period of 64 μs, and a video duration of 52 μs as shown in FIG. 3(A). In this case, a time-division-multiplexed signal shown in FIG. 3(B) is generated from the time-division-multiplexed signal generating circuit 17. As shown in FIG. 3(B), a discriminating burst signal BS is multiplexed to a horizontal synchronizing signal H.S for every 1H(=64 μs). Moreover, the horizontal synchronizing signal H.S, a color reference level $L_1$ or $L_2$, one of the time base compressed color difference signals $(R-Y)_c$ and $(B-Y)_c$, and a time base compressed luminance signal $Y_c$ are time-division-multiplexed. Further, the time base compressed color difference signals are transmitted in line-sequence.

The time-division-multiplexed signal from the time-division-multiplexed signal generating circuit 17, is supplied to a subtracting circuit 24 which will be described later on in the specification, and to a highpass filter 18 wherein a high-frequency component of the time-division-multiplexed signal is separated. The highpass filter 18 produces a high-frequency time-division-multiplexed signal b having a frequency spectrum shown in FIG. 2(B), and supplies this signal b to a 2H delay circuit 19 and to an adding circuit 20. The 2H delay circuit 19 and the adding circuit 20 constitute a comb filter. Only a frequency component of the high-frequency time-division-multiplexed signal, having a correlation of 2H, is obtained from the adding circuit 20 which adds the input and output signals of the 2H delay circuit 19. Accordingly, a high-frequency time-division-multiplexed signal c having a frequency spectrum shown in FIG. 2(C), is obtained from the adding circuit 20. As shown in FIG. 2(C), the high-frequency time-division-multiplexed signal c is solely made up of frequency components which are integral multiples of ½ the horizontal scanning frequency $f_H$, and essentially has a center frequency of $192f_H$.

On the other hand, the high-frequency time-division-multiplexed signal from the 2H delay circuit 19, which has been delayed by 2H, is supplied to an adding circuit 22 and is added with the time-division-multiplexed signal from the time-division-multiplexed signal generating circuit 17. An output signal of the adding circuit 22 is supplied to a level attenuator 23 wherein the level of the signal is attenuated by ½. An output signal of the level attenuator 23 is supplied to the subtracting circuit 24. The subtracting circuit 24 subtracts the output signal of the level attenuator 23 from the time-division-multiplexed signal from the time-division-multiplexed signal generating circuit 17, and produces a signal d having a frequency spectrum shown in FIG. 2(D). In the full frequency band of the time-division-multiplexed signal from the time-division-multiplexed signal generating circuit 17, the low-frequency band which is blocked in the highpass filter 18 remains unchanged, as shown in FIG. 2(D). On the other hand, in the passing frequency band of the highpass filter 18, the output signal d of the subtracting circuit 24 is solely made up of frequency components which are odd number multiples of ¼ the horizontal scanning frequency $f_H$. The time-division-multiplexed signal d from the subtracting circuit 24 is supplied to a lowpass filter 25 wherein high-frequency components over a predetermined frequency are eliminated. As a result, a signal e having a frequency spectrum shown in FIG. 2(E) is obtained from the lowpass filter 25 and supplied to a signal processing circuit 26.

The cutoff frequency of the lowpass filter 25 is selected to a frequency so that the frequency characteristics and the phase characteristics of the low-frequency component e of the time-division-multiplexed signal (low-frequency time-division-multiplexed signal) from the lowpass filter 25 and the time-division-multiplexed signal c satisfactorily connect at the time of the reproduction, as may be seen from FIGS. 2(C) and 2(E).

The low-frequency time-division-multiplexed signal e from the lowpass filter 25, is supplied to the signal processing circuit 26 wherein the low-frequency time-division-multiplexed signal is first subjected to a pre-emphasis. Then, the pre-emphasized signal is clipped at the white peak level, and this clipped signal is supplied to a frequency modulator 27. The frequency modulator 27 performs a frequency modulation so that the synchronizing tip level becomes 4.2 MHz and the white peak level becomes 5.4 MHz, for example. A frequency modulated low-frequency time-division-multiplexed signal (FM low-frequency time-division-multiplexed signal) from the frequency modulator 27, is supplied to a highpass filter 28 wherein an unwanted low-frequency component is eliminated. An output signal of the highpass filter 28 is supplied to an adding circuit 29.

On the other hand, the horizontal synchronizing signal which is separated from the standard system color video signal and applied to an input terminal 30, is supplied to a phase locked loop (PLL) 31. A signal which is in phase with the horizontal synchronizing signal is obtained from the PLL 31 and supplied to a phase shifting circuit 32. This phase shifting circuit 32 has a known construction which is disclosed in the British Pat. No. 2040135, for example. A so-called drum pulse which is in phase with the rotational phase of a recording head means 36 and is produced by known means, is applied to the phase shifting circuit 32 through an input terminal 59. The phase shifting circuit 32 is also supplied with the output signal of the PLL 31 described before. For example, the phase shifting circuit 32 forms four kinds of square waves which have a repetition frequency of $(232f_H+f_H/8)$ and mutually differ in phase by 90°, and these four kinds of square waves are switched for every 1H so as to produce a continuous square wave in which the phase shifts in a predetermined direction for every 1H. The the phase shifts and the phase shift is stopped in the continuous square wave, for every one track scanning period in which the recording head means 36 forms one video track on a magnetic tape 37a. The continuous square wave from the phase shifting circuit 32 is supplied to a frequency converter 21 as a first frequency converting signal.

The frequency converter 21 performs a frequency conversion so as to obtain a frequency component which is a difference between the first frequency converting signal and the high-frequency time-division-multiplexed signal c. In other words, the frequency converter 21 performs a frequency conversion to a low-frequency band so that the frequency component of the high-frequency time-division-multiplexed signal essentially having a center frequency of $192f_H$ becomes an integral multiple of $\frac{1}{4}$ the horizontal scanning frequency $f_H$, that is, $(40f_H + f_H/8)$, for example, in order to produce a low-band converted high-frequency time-division-multiplexed signal. An output signal of the frequency converter 21 is supplied to a lowpass filter 33 wherein an unwanted high-frequency component is eliminated, and an output signal of this lowpass filter 33 is supplied to the adding circuit 29.

The adding circuit 29 frequency-division-multiplexes the output signals of the highpass filter 28 and the lowpass filter 33, and a frequency modulated audio signal which is applied to an input terminal 34, and produces a frequency-division-multiplexed signal f having a frequency spectrum shown in FIG. 2(F). In the frequency spectrum shown in FIG. 2(F), the frequency spectrum of the FM time-division-multiplexed signal from the highpass filter 28 is represented by I, and the deviation frequency band of the carrier is shown by oblique lines. The frequency spectrum of the low-band converted high-frequency time-division-multiplexed signal from the lowpass filter 33, having $(40f_H + f_H/8)$ as its center frequency, is represented by II. Further, the frequency spectrum of the FM audio signal which is applied to the input terminal 34 and has the frequency band of 1.4 MHz ± 100 kHz, for example, is represented by III.

Figure 4:
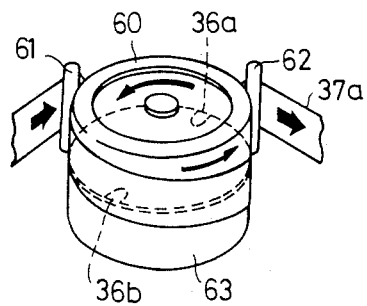
FIG. 4 is a perspective view showing a state where a recording head makes contact with a magnetic tape.

The frequency-division-multiplexed signal f is supplied to the recording head means 36 through a recording amplifier 35, and is recorded on the magnetic tape 37a by the recording head means 36. For example, the recording head means 36 may comprise a pair of magnetic heads 36a and 36b which are angularly separated by 180° and are mounted on a rotating plane of an upper rotary drum 60, as shown in FIG. 4. These magnetic heads 36a and 36b have gaps of mutually different azimuth angles. The magnetic tape 37a is guided by guide poles 61 and 62 as shown in FIG. 4, and is wrapped obliquely around the upper rotary drum 60 and a lower stationary drum 63 over an angular range of approximately 180° along a tape guide band which is formed obliquely on the lower stationary drum 63. The tape 37a is moved in a state pinched between a capstan and a pinch roller which are not shown in FIG. 4. In FIG. 4, the upper rotary drum 60 is rotated counterclockwise.

Figure 5:
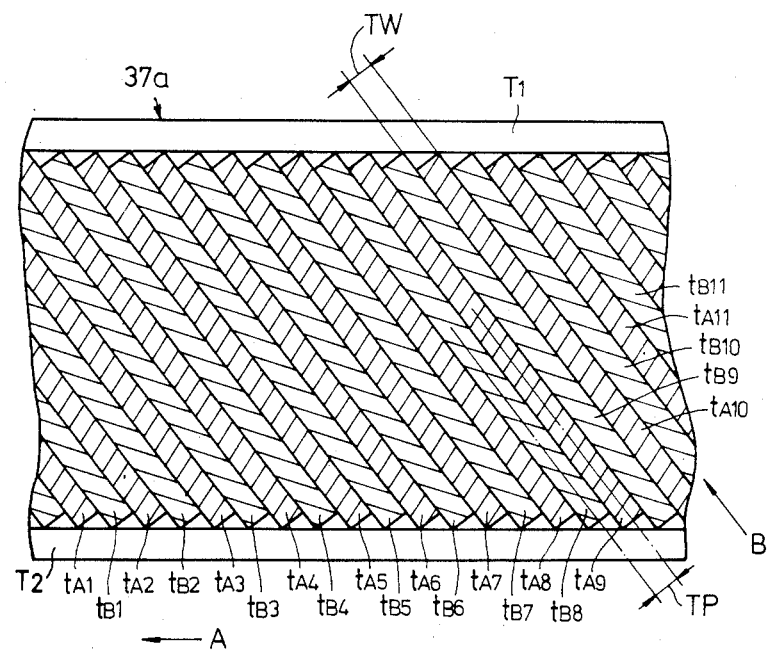
FIG. 5 shows an example of a track pattern formed on the magnetic tape.

By the magnetic heads 36a and 36b shown in FIG. 4 of the known rotary 2-head system VTR, video tracks $t_{A1}$ through $t_{A11}$ and $t_{B1}$ through $t_{B11}$ are formed on the tape 37a as shown in FIG. 5. These video tracks $t_{A1}$ through $t_{A11}$ and $t_{B1}$ through $t_{B11}$ have a track width TW, and are formed with a track pitch TP without a guard band (or so that the guard band is extremely narrow). The frequency-division-multiplexed signal f having the frequency spectrum shown in FIG. 2(F) and corresponding to one field, is recorded on one video track. Actually, there is a slight overlap recording section on the track, and the frequency-division-multiplexed signal corresponding to slightly more than one field is recorded on one track. The video tracks $t_{A1}$, $t_{A2}$, $t_{A3}$, ..., $t_{A11}$ on the tape 37a are formed by the magnetic head 36a, and the video tracks $t_{B1}$, $t_{B2}$, $t_{B3}$, ..., $t_{B11}$ on the tape 37a are formed by the magnetic head 36b. Accordingly, between two adjacent video tracks on the tape 37a, the first frequency-division-multiplexed signal is recorded by the magnetic head 36a on one of the two adjacent video tracks, and the second frequency-division-multiplexed signal is recorded by the magnetic head 36b on the other of the two adjacent video tracks. Accordingly, the two mutually adjacent video tracks on the tape 37a are recorded by the magnetic heads having gaps of mutually different azimuth angles. Moreover, the low-band converted high-frequency time-division-multiplexed signal in the frequency-division-multiplexed signal f is recorded on the two mutually adjacent tracks, so that the phase is shifted with respect to one of the two adjacent tracks and the phase shift is stopped with respect to the other of the two adjacent tracks.

In FIG. 5, the tape 37a is moved in the direction of an arrow A. As is well known, an audio track $t_1$ is formed by an audio head and a control track $T_2$ is formed by a control head, together with the video tracks described before. The magnetic heads 36a and 36b scan in the direction of an arrow B.

Next, description will be given with respect to the operation of the apparatus at the time of a reproduction. The frequency-division-multiplexed signal f which is recorded on a magnetic tape 37b in the same manner as the magnetic tape 37a described before, is reproduced by a reproducing head means 38 which is constructed similarly as the recording head means 36 and comprises a pair of magnetic heads. The frequency-division-multiplexed signal f which is reproduced by the reproducing head means 38, is supplied to a lowpass filter 40, a highpass filter 41, and a bandpass filter 42, through a reproducing amplifier 39. An FM audio signal $f_3$ having the frequency spectrum III shown in FIG. 2(F), is separated in the bandpass filter 42. This FM audio signal is passed through a frequency demodulator 43, and is produced through an output terminal 44 as a reproduced audio signal.

On the other hand, a reproduced low-band converted high-frequency time-division-multiplexed signal $f_2$ having the frequency spectrum II shown in FIG. 2(F), is separated in the lowpass filter 40. This low-band converted high-frequency time-division-multiplexed signal $f_2$ is supplied to a frequency converter 45 wherein a frequency conversion is performed so as to obtain a frequency component which is a sum of the signal $f_2$ and a second frequency converting signal from the phase shifting circuit 32. As a result, a reproduced high-frequency time-division-multiplexed signal c having the original frequency band in the frequency spectrum shown in FIG. 2(C), is produced from the frequency converter 45. The reproduced high-frequency time-division-multiplexed signal c is supplied to a 2H delay circuit 47 and an adding circuit 48, through a bandpass filter 46. The 2H delay circuit 47 and the adding circuit 48 constitute a comb filter for eliminating the crosstalk. The 2H delay circuit 47 is constituted by an analog memory such as a charge coupled device (CCD), or a digital memory such as a random access memory (RAM). The delay quantity of the 2H delay circuit 47 is variably controlled about a delay quantity of 2H, responsive to a clock pulse from a PLL 49.

At the time of the reproduction, a reproduced horizontal synchronizing signal having the same time base deviation (jitter) as the reproduced signal, is supplied to the PLLs 31 and 49, through the input terminal 30. The phase shifting circuit 32 produces a square wave in which the phase is shifted by 90° in a predetermined direction for every 1H, and in which the phase shifting process is performed with an interval of one track scanning period. This square wave from the phase shifting circuit 32 has the same repetition frequency as the first frequency converting signal described before, and is supplied to the frequency converter 45 as the second frequency converting signal. In the second frequency converting signal, the phase shifting direction is selected essentially in the opposite direction as the phase shifting direction at the time of the recording, so as to cancel the phase shift at the time of the recording by the frequency conversion in the frequency converter 45. The clock pulse which is supplied to the 2H delay circuit 47 from the PLL 49, includes a time base deviation which is the same as the time base deviation introduced upon reproduction. Accordingly, the delay quantity of the 2H delay circuit 47 is controlled, following the time base deviation introduced upon reproduction. Thus, the 2H delay circuit 47 and the adding circuit 48 can satisfactorily perform a comb filter operation, unaffected by the time base deviation upon reproduction.

The signal which has been recorded on a track which is adjacent to the track which is being reproduced by the reproducing head means 38, is reproduced as crosstalk. However, the FM time-division-multiplexed signal from the adjacent track, having the high frequency, will not mix into the reproduced signal due to the azimuth loss effect. On the other hand, the low-band converted high-frequency time-division-multiplexed signal from the adjacent track, having the low frequency, will mix into the reproduced signal as crosstalk because the azimuth loss effect is not sufficient in this case. Therefore, frequency conversions are performed in the frequency converters 21 and 45 by use of frequency converting signals in which the phase is shifted by 90° for every 1H with an interval of one track scanning period.

When reproducing a track recorded with the low-band converted high-frequency time-division-multiplexed signal which has been subjected to the phase shift process described before, a phase shifting process is performed so as to cancel the phase shift performed at the time of the recording. Thus, the crosstalk component of the low-band converted high-frequency time-division-multiplexed signal which has been recorded on the adjacent track without the phase shift, is also subjected to the phase shift of 90° upon reproduction. As a result, the crosstalk component which is reproduced in a certain 1H and the crosstalk component which was reproduced 2H before the certain 1H, have mutually opposite polarities. On the other hand, when reproducing a track recorded with the low-band converted high-frequency time-division-multiplexed signal which has not been subjected to the phase shift process, a phase shift process is not performed. Thus, the crosstalk component of the low-band converted high-frequency time-division-multiplexed signal which has been subjected to the phase shift process and recorded on the adjacent track, is also not subjected to the phase shift upon reproduction. Consequently, the crosstalk component which is reproduced in a certain 1H and the crosstalk component which was reproduced 2H before the certain 1H, also have mutually opposite polarities in this case.

On the other hand, because the reproduced high-frequency time-division-multiplexed signal is a high-frequency signal in which the line-sequential color difference signal is time-division-multiplexed to the time base compressed luminance signal, where the line-sequential color difference signal is made up of two color difference signals (R−Y) and (B−Y) which are alternately and time-sequentially multiplexed for every 1H, substantially the same chrominance information is repeatedly obtained for every 2H. Therefore, by taking this line correlation of 2H into consideration and mixing the input and output signals of the 2H delay circuit 47, it is possible to mutually cancel the crosstalk components from the adjacent track. In other words, it is possible to obtain only the high-frequency time-division-multiplexed signal which was recorded on the track which is being reproduced. This reproduced high-frequency time-division-multiplexed signal in which the crosstalk components from the adjacent track have been mutually cancelled, is obtained from the adding circuit 48 and supplied to an adding circuit 50.

A reproduced FM low-frequency time-division-multiplexed signal $f_1$ having the frequency spectrum I in FIG. 2(F), which is separated in the highpass filter 41, is frequency-demodulated into a reproduced low-frequency time-division-multiplexed signal in a frequency demodulator 51. The reproduced low-frequency time-division-multiplexed signal from the frequency demodulator 51, is supplied to the adding circuit 50 through a de-emphasis circuit 52. The adding circuit 50 adds the reproduced high-frequency time-division-multiplexed signal from the adding circuit 48 and the reproduced low-frequency time-division-multiplexed signal from the de-emphasis circuit 52, and produces a reproduced time-division-multiplexed signal which has been returned to the original frequency band. This reproduced time-division-multiplexed signal from the adding circuit 50, is supplied to a switching circuit 53. The switching circuit 53 separates a reproduced time base compressed line-sequential color difference signal and a reproduced time base compressed luminance signal from the reproduced time-division-multiplexed signal, and supplies the reproduced time base compressed line-sequential color difference signal to a time base expanding circuit 56, and supplies the reproduced time base compressed luminance signal to a time base expanding circuit 54.

The time base expanding circuit 54 expands the time base of the reproduced time base compressed luminance signal (to 5/4 in this case), so as to obtain a reproduced luminance signal in which the time base has been returned to the original time base and which has been returned to the original frequency band.

On the other hand, the reproduced time base compressed line-sequential color difference signal is time base expanded to 5 times in the time base expanding circuit 56, so as to obtain a reproduced line-sequential color difference signal which has been returned to the original time base. This reproduced line-sequential color difference signal from the time base expanding circuit 56 is supplied to a color encoder 57 wherein the signal is converted into a reproduced carrier chrominance signal having a signal format which is in conformance with the standard system. The reproduced carrier chrominance signal from the color encoder 57 is multiplexed with the reproduced luminance signal from the time base expanding circuit 54, in an adding circuit 55. As a result, a reproduced standard system color video signal is produced through an output terminal 58.

According to the present embodiment, the luminance signal and the line-sequential color difference signal are transmitted in a state where the high-frequency components thereof are converted into the low-frequency band. Hence, the frequency band in which the luminance signal and the linesequential color difference signal may be recorded and reproduced can be widened compared to the conventional case, and for this reason, it is possible to improve the resolution of the color picture.

The low-band converted high-frequency time-division-multiplexed signal $f_2$ has the frequency spectrum II shown in FIG. 2(F), in which signal components exist for every $f_H/2$ about a signal component ($40f_H+f_H/8$ in this case) which is an odd number multiple of $\frac{1}{8}$ the horizontal scanning frequency $f_H$. Hence, when the FM low-frequency time-division-multiplexed signal and the low-band converted high-frequency time-division-multiplexed signal are simultaneously recorded on the magnetic tape 37a and these signals are simultaneously reproduced from the magnetic tape 37b, a cross modulation component between the two signals is generated. Especially the cross modulation component of $2f_s$ which appears within the frequency band of the demodulated low-frequency time-division-multiplexed signal, introduces a problem in that it introduces moire in the picture, where $f_s$ is the center frequency of the low-band converted high-frequency time-division-multiplexed signal and is equal to ($40f_H+f_H/8$) in this case. However, in the present embodiment, the cross modulation component of $2f_s$ is interleaved in the frequency spectrum of the demodulated low-frequency time-division-multiplexed signal, and for this reason, the moire can be made visually less conspicuous by frequency interleaving. In other words, when the equation $2f_s=(2n-1)f_H/4$ is satisfied, the frequency spectrum of the cross modulation component of $2f_s$ does not overlap with the frequency spectrum of the demodulated low-frequency time-division-multiplexed signal. Therefore, the center frequency $f_s$ of the low-band converted high-frequency time-division-multiplexed signal is selected to ($40f_H+f_H/8$) which satisfies the above equation when $n=161$.

The color video signal recording and reproducing apparatus according to the present invention is not limited to the embodiment described heretofore, and other applications are possible. Description was given heretofore with respect to a case where the video tracks are alternately formed on the magnetic tape 37a by two magnetic heads having gaps of mutually different azimuth angles, without a guard band between the two adjacent video tracks. However, the video tracks may be formed so that a guard band is formed between the two adjacent video tracks. In this case, it is unnecessary to provide means for eliminating the crosstalk from the adjacent track. In other words, it is unnecessary to provide phase shift processing means such as the phase shifting circuit 32, and the comb filter which is made up of the 2H delay circuit 47 and the adding circuit 48.

The 2H delay circuits 19 and 47 may be used in common. Moreover, audio signals of two or more channels may be recorded and reproduced by setting the carrier frequencies of FM audio signals to mutually different frequencies. The audio signal need not be recorded on the video track, and may be recorded by a stationary audio head as in the conventional apparatus. Further, in the embodiments described heretofore, the two kinds of color difference signals are obtained by demodulating the carrier chrominance signal which is separated from the standard system color video signal, however, the present invention may be applied with respect to a luminance signal and two kinds of color difference signals which are obtained from a matrix circuit by supplying to the matrix circuit three primary color signals which are obtained by picking up an image by a television camera, for example.

In addition, the low-frequency component of the luminance signal need not be subjected to a time base compression, and may be time-division-multiplexed to the time base compressed line-sequential color difference signal by blocking the transmission during a part of the video duration. Moreover, the time base compression ratio of the time base compressed line-sequential color difference signal may be selected to a large value so that a color difference signal of 52 $\mu$s is transmitted in several $\mu$s, in order to time-division-multiplex the low-frequency component of the luminance signal to the time base compressed line-sequential color difference signal essentially without blocking and without time base compressing the low-frequency component of the luminance signal.

Further, the present invention is not limited to these embodiments, but various variations and modifications may be made without departing from the scope of the present invention.

What is claimed is:

1. A color video signal recording and reproducing apparatus comprising:

luminance signal producing means for producing a luminance signal which has or has not been subjected to a time base compression, between the luminance signal and a carrier chrominance signal which constitute a standard system color video signal;

time base compressed line-sequential color difference signal forming means for forming a time base compressed line-sequential color difference signal from two kinds of color difference signals which constitute the carrier chrominance signal;

a time-division-multiplexed signal generating circuit supplied with the output signal of said luminance signal producing means and the time base compressed line-sequential color difference signal from said time base compressed line-sequential color difference signal forming means, for generating a time-division-multiplexed signal in which one of two kinds of time base compressed color difference signals which constitute the time base compressed line-sequential color difference signal and the output signal of said luminance signal producing means are time-sequentially multiplexed within one horizontal scanning period;

separating means for separating a low-frequency component of the time-division-multiplexed signal from said time-division-multiplexed signal generating circuit, so as to obtain a low-frequency time-division-multiplexed signal;

a modulator for frequency-modulating a carrier by the low-frequency time-division-multiplexed signal from said separating means, so as to obtain a frequency modulated signal;

first frequency converting means for separating a high-frequency component of the time-division-multiplexed signal by use of a filter circuit, and for frequency-converting the high-frequency component to a frequency band which is lower than the frequency band of the frequency modulated signal so as to produce a low-band converted high-frequency time-division-multiplexed signal;

recording and reproducing means for recording a frequency-division-multiplexed signal on a recording medium and reproducing the frequency-division-multiplexed signal from the recording medium, said frequency-division-multiplexed signal being obtained by frequency-division-multiplexing at least the frequency modulated signal and the low-band converted high-frequency time-division-multiplexed signal;

demodulating means for obtaining a reproduced low-frequency time-division-multiplexed signal by frequency-selecting a reproduced frequency modulated signal from the frequency-division-multiplexed signal which is reproduced by said recording and reproducing means and frequency-demodulating the reproduced frequency modulated signal;

second frequency converting means for frequency-selecting a reproduced low-band converted high-frequency time-division-multiplexed signal from the frequency-division-multiplexed signal which is reproduced by said recording and reproducing means, and for frequency-converting the reproduced low-band converted high-frequency time-division-multiplexed signal back to the original frequency band so as to obtain a reproduced high-frequency time-division-multiplexed signal;

deriving means for deriving a reproduced time base compressed line-sequential color difference signal and a reproduced luminance signal which has or has not been subjected to a time base compression, from a reproduced time-division-multiplexed signal which is obtained by mixing the output signals of said demodulating means and said second frequency converting means;

a carrier chrominance signal reproducing circuit for forming a reproduced carrier chrominance signal having a signal format which is in conformance with the standard system by subjecting the reproduced time base compressed line-sequential color difference signal from said deriving means to a time base expansion so as to return the time base to the original time base; and a color video signal forming circuit for forming a reproduced color video signal which is in conformance with the standard system, from the reproduced luminance signal from said deriving means and the reproduced carrier chrominance signal from said carrier chrominance signal reproducing circuit.

2. A recording and reproducing apparatus as claimed in claim 1 in which said filter circuit within said first frequency converting means comprises a highpass filter for separating the high-frequency component of said time-division-multiplexed signal, and a first comb filter supplied with an output signal of said highpass filter, for obtaining therefrom only a frequency component which is an integral multiple of ½ the horizontal scanning frequency, and said second frequency converting means comprises a second comb filter located in an output stage thereof for eliminating from said reproduced high-frequency time-division-multiplexed signal a crosstalk component from an adjacent track.

3. A recording and reproducing apparatus as claimed in claim 2 in which said second comb filter comprises a delay circuit having a delay time of two horizontal scanning periods and an adding circuit for adding input and output signals of said delay circuit, and said delay circuit comprises an analog or digital memory and means for generating a clock pulse in phase with a horizontal synchronizing signal separated from a reproduced signal which is reproduced from said recording medium to drive said analog or digital memory by the clock pulse so that a delay quantity of said delay circuit is variably controlled to follow a time base deviation in said reproduced signal.

4. A recording and reproducing apparatus as claimed in claim 1 in which said separating means comprises a filter circuit for producing said low-frequency time-division-multiplexed signal having an upper limit frequency selected slightly higher than a lower limit frequency of said high-frequency time-division-multiplexed signal.

5. A recording and reproducing apparatus as claimed in claim 2 in which said first frequency converting means frequency-converts the high-frequency component of said time-division-multiplexed signal into a low-frequency band so that an approximate center frequency of the high-frequency component of said time-division-multiplexed signal becomes an integral multiple of ½ the horizontal scanning frequency, by use of a first frequency converting signal in which the phase is shifted in a predetermined direction by approximately 90° for every one horizontal scanning period with an interval of one track scanning period, and said second frequency converting means frequency-converts said reproduced low-band converted high-frequency time-division-multiplexed signal to the original frequency band by use of a second frequency converting signal which has the same repetition frequency as said first frequency converting signal, the phase of said second frequency converting signal being shifted by approximately 90° for every one horizontal scanning period essentially in a direction opposite to the phase shifting direction of said first frequency converting signal so as to cancel the phase shift at the time of the recording, the phase shift of said second frequency converting signal being carried out for every other one track scanning period.

6. A recording and reproducing apparatus as claimed in claim 1 in which said luminance signal producing means comprises a time base compressing circuit for subjecting the luminance signal to a time base compression, and said deriving means comprises a time base expanding circuit for subjecting a reproduced time base compressed luminance signal so that the time base thereof is returned to the original time base.

7. A recording and reproducing apparatus as claimed in claim 1 in which said recording and reproducing means forms a frequency-division-multiplexed signal in which the output signals of said modulator and said first frequency converting means and an independently formed frequency modulated audio signal are frequency-division-multiplexed, and records said frequency-division-multiplexed signal on said recording medium and reproduces said frequency-division-multiplexed signal from said recording medium.

* * * * *